(12) United States Patent
Ghosh et al.

(10) Patent No.: US 6,803,011 B2
(45) Date of Patent: Oct. 12, 2004

(54) METHOD FOR MAKING AN INJECTION MOLDABLE FEEDSTOCK WHICH CAN PROVIDE ARTICLES WITH IMPROVED PHYSICAL PROPERTIES

(75) Inventors: Syamal K. Ghosh, Rochester, NY (US); Dilip Chatterjee, Rochester, NY (US); Donn B. Carlton, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 352 days.

(21) Appl. No.: 09/771,250

(22) Filed: Jan. 26, 2001

(65) Prior Publication Data

US 2002/0145223 A1 Oct. 10, 2002

(51) Int. Cl.[7] .............................................. B29C 45/00
(52) U.S. Cl. .................. 264/328.6; 264/141; 264/328.1
(58) Field of Search .............................. 264/140, 328.6, 264/328.1, 141, 349, 645

(56) References Cited

U.S. PATENT DOCUMENTS

| 4,141,726 | A | * | 2/1979 | Yajima et al. ................. 75/229 |
| 4,839,128 | A | * | 6/1989 | Yoshino et al. ........... 264/328.1 |
| 5,091,135 | A | * | 2/1992 | Okada et al. ........... 264/272.13 |
| 5,242,872 | A | * | 9/1993 | Taniguchi et al. ......... 501/98.5 |
| 5,326,518 | A | * | 7/1994 | Kimura et al. .............. 264/645 |
| 6,165,407 | A | * | 12/2000 | Tahara et al. ............. 264/328.1 |
| 6,518,323 | B1 | * | 2/2003 | Scheying et al. .............. 521/50 |
| 2002/0145222 | A1 | * | 10/2002 | Carlton et al. .............. 264/140 |
| 2002/0171167 | A1 | * | 11/2002 | Chatterjee et al. .......... 264/140 |

* cited by examiner

Primary Examiner—Michael P. Colaianni
Assistant Examiner—Monica A. Fontaine
(74) Attorney, Agent, or Firm—Stephen H. Shaw

(57) ABSTRACT

A method of making a feedstock for injection molding, including the steps of: mixing at a temperature of at least 100° C. polymeric materials having a thermal conductivity in the range of 0.001 to 0.01 cal/cm-sec-° C. wherein the polymeric materials are selected from the group consisting of polyethylene, polystyrene, polyester, and polycarbonate or combinations thereof, and one or more materials selected from the group consisting of ceramics, ceramic composites, metals and metal alloys in a blended relationship to form a viscous phase mixture, the materials in the viscous phase mixture being selected so that when in a solid phase it has a density greater than 4 grams/cc and a thermal conductivity greater than 0.101 cal/cm-sec-° C. and; cooling the blended viscous phase mixture to form the feedstock.

21 Claims, 1 Drawing Sheet

METHOD FOR MAKING AN INJECTION MOLDABLE FEEDSTOCK WHICH CAN PROVIDE ARTICLES WITH IMPROVED PHYSICAL PROPERTIES

FIELD OF THE INVENTION

This invention relates to a method for making feedstock materials that can be injection molded to produce articles with improved physical properties, and a feedstock made thereby.

BACKGROUND OF THE INVENTION

Polymer composite enclosure bodies provide light and durable protection for various equipment, particularly, for electronic gadgets. Some polymer composite enclosure bodies protect the highly complex inner workings of devices such as cameras, radios, cassette players, DVD players, CD players, TVs, and other portable devices of the modem age. Unfortunately, a belief has arisen in the consumer community that devices that have polymer or plastic enclosure bodies are inherently less sophisticated, less expensive, and less aesthetically appealing than metal enclosure bodies. Some attempts to address the aesthetic appeal have included using and/or applying various colors to polymer composites. Users frequently judge injection molded polymeric articles on the basis of their weight and also their tactile properties. Typically, the polymeric materials do not have enough weight or mass and also do not have good tactile properties to be aesthetically pleasing.

SUMMARY OF THE INVENTION

It is an object of this present invention to provide a material which is particularly suitable for injection molding so that the injection molded article will be aesthetically pleasing in terms of weight and tactile feel. This object is achieved by providing a method of making a feedstock for injection molding, including the steps of: mixing at a temperature of at least 100° C. polymeric materials having a thermal conductivity in the range of 0.001 to 0.01 cal/cm-sec-° C. wherein the polymeric materials are selected from the group consisting of polyethylene, polystyrene, polyester, and polycarbonate or combinations thereof, and one or more materials selected from the group consisting of ceramics, ceramic composites, metals and metal alloys in a blended relationship to form a viscous phase mixture, the materials in the viscous phase mixture being selected so that when in a solid phase it has a density greater than 4 grams/cc and a thermal conductivity greater than 0.101 cal/cm-sec-° C. and; cooling the blended viscous phase mixture to form the feedstock.

The advantages of the present invention include:

Developing a family of organic/inorganic composite feedstock which can be successfully utilized in manufacturing injection molded articles with superior mechanical, physical, and tactile properties.

Combining a very cost-effective feedstock which can be readily injection molded to form articles with enhanced mechanical, physical, and tactile properties.

Recognizing that articles made with a feedstock in accordance with the present invention can have high mechanical strength, can have small cross-sectional dimensions and can be made with reduced material cost and processing time.

DETAILED DESCRIPTION OF THE INVENTION

Figure 1:
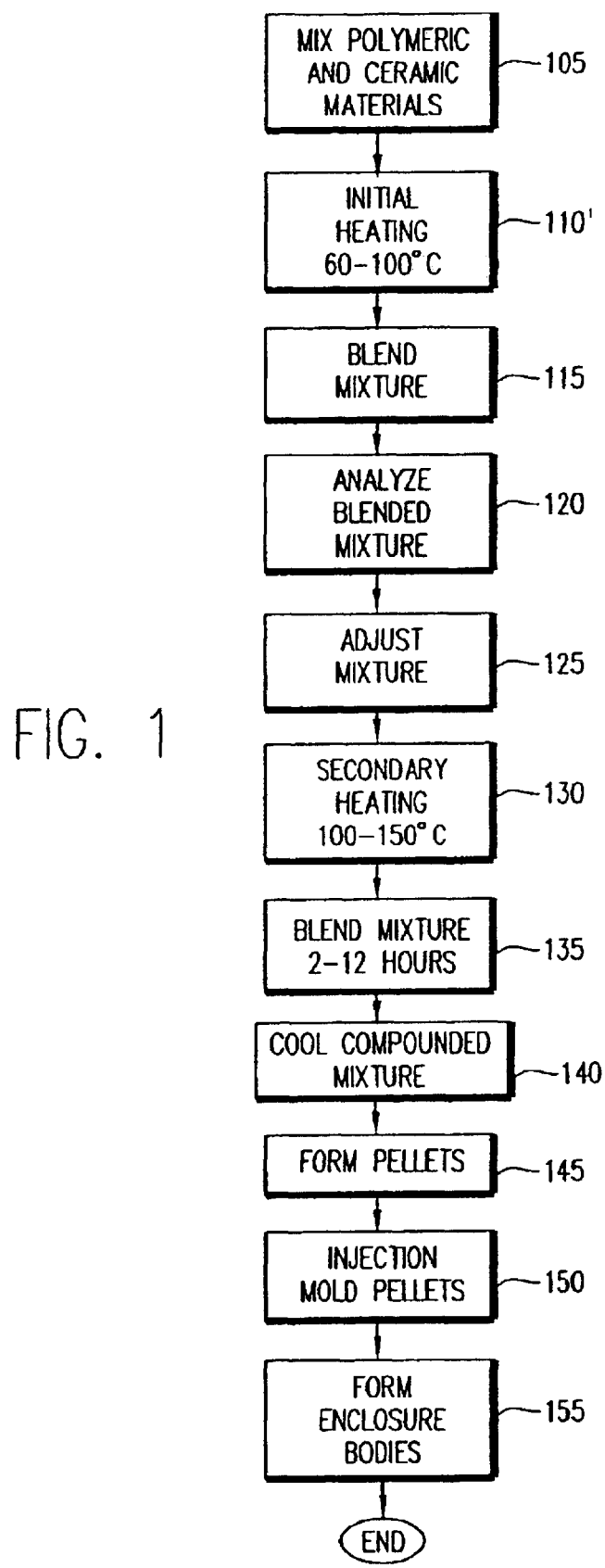
FIG. 1 is a schematic block diagram showing the various steps in making a mixture which can be formed into a solid article, pelletized, and injection molded to form an article.

This invention generally relates to a method of making injection molding feedstock by mixing complex, net-shaped plastic or polymer composites with inorganic materials, for example, ceramics and metals, and subsequently compounding the mixture prior to an injection molding process. More particularly, this invention relates to a method of injection molding polymers compounded with ceramics and or metal or alloys. The compounding method involves mixing inorganic particulates such as ceramic or metal or alloy powders with polymers or plastics, such as polystyrene (commercially available in the name of Zylar®) in appropriate proportions at an elevated temperature. The mixing is done at a relatively high temperature ranging between 100° and 150° Centigrade under a high shear condition using a twin screw mixer. Mixing time generally varies between 2 and 12 hours so that a uniform mixture is obtained. The mixture is then cooled to room temperature and pelletized to provide feedstock for the subsequent injection molding process, the details of which are described below.

Referring to FIG. 1, a block diagram of an example embodiment of a compounding and injection molding process where polymeric and ceramic composite powders are initially mixed in proper proportions in step 105. All the ingredients (as described in working examples) are initially heated within a temperature range of 100 to 150° C. (preferably, between 110 to 150° C., and depending on the specific ingredients that are mixed) in step 110 and blended in a twin screw mixer in step 115 until all the organic or polymeric materials are dissolved and intimately mixed with the inorganic materials such as ceramics, ceramic composites, metals, and metal alloys. Next step is to analyze the blend in step 120 either by standard chemical analysis methods or by X-ray diffraction, or by employing X-ray florescence analysis in order to establish the blending process. Based on the analysis, for example, determining the likely final strength or color component, the ingredients are adjusted to fine tune the process in step 125. In the next step 130 of the process the temperature of the mixer is increased to a range of 100° to 150°, preferably to 130° C., and extended blended for at least 2 to 12 hours in step 135, preferably 4 hours and the compounded mixture is cooled to room temperature in step 140. The cooled compounded mix is then either shredded to small pieces or pelletized in step 145 to provide feedstock for the subsequent injection molding process in step 150. The injection molding was carried out in a machine manufactured by Boy, Model # 22M. The injection-molded parts and/or enclosure bodies in step 155 were inspected carefully so that the enclosure bodies did not warp due to flaws in the injection molding process parameter selection.

Some inherent physical properties (like thermal conductivity and density), of all commercially available plastics (polymers) are inferior to those of metals or ceramics. As a result, the human perception and experience of plastic is neither very complimentary nor very pleasant. Plastic is usually viewed as a material that is relatively inexpensive and not durable. On the other hand, there are commercially available plastic-based composites which are designed for heavy-duty applications and are generally more expensive than either engineering plastic or engineering metals. Therefore, a need exists for developing special composite materials which are not as expensive as metals, ceramics or commercially available plastic-based composites. The injection molded composites of the present invention can include plastics, ceramics, and metals. These injection molded composites overcome all the negative attributes of plastics, and compliment the family of commercially available plastic-based composites. The composites of the present invention do provide enhanced physical attributes such as better tactile properties than plastics, and do have an apparent feel of durability and value.

Experiments were conducted to develop injection moldable composite feedstock having enhanced physical attributes as mentioned above, comprising a mixture of polymers, metals, metallic alloys or ceramics. Engineering plastics, generally used for manufacturing component housing, such as polyethylene, polystyrene, polyester, and polycarbonate, were selected as polymeric components for the composite mix. Metals and alloys were selected and classified into various groups based on their physical appearance and mechanical and physical properties. One such group comprised Al, Ti, Mg, Al—Ti—V alloys, and/or mixtures thereof. Another group consisted of Ni, Cr, stainless steel, and/or mixtures thereof. Similarly, ceramics were selected based on the same criteria as metals and alloys. They too were classified into several groups. One such group comprised thermally and electrically insulating oxides, such as alumina, zirconia, magnesia, silica, and/or mixtures thereof. Another group comprised thermally conductive carbides, such as SiC, TiC, $B_4C$, WC, and/or mixtures thereof. Oxide ceramics having a wide spectrum of colors were selected for mixing with polymers and/or metals to form a class of composites for our application. Oxide ceramics which exhibit a wide variety of colors are generally those which are the oxides of transition elements like V, Cr, Mn, Fe, Co, Ni., and also the oxides of rare earth elements like La, Ce, Pr, Nd and Gd, and/or mixtures thereof. Whereas, nitride ceramics were selected for their excellent physical properties and also variety of colors, e.g., TiN, silicon nitride, BN, zirconium nitride, and/or mixtures thereof.

The injection molded composite parts comprising polymer-ceramic, polymer-metal, polymer-metal alloy, and polymer-metal-ceramic were evaluated for various physical and mechanical properties. Most of the injection molded composite parts had the physical appearance and feel of plastics. Physical and tactile properties of the composites varied widely depending on the volume fraction of each constituent and their relative physical and mechanical properties. But, surprisingly few injection molded composites had physical appeal and tactility which differentiated them from commercially available plastics and polymer-based composites. Physical and mechanical properties of those composites were measured and their physical appeal was evaluated for our application.

There are many measurable physical properties, such as thermal conductivity, specific heat, density, surface texture, and coefficient of friction, which contribute to the human perception of good physical appeal of a given material. Unlike those measurable physical properties, there are some physical characteristics, which cannot be measured quantitatively but are directly related to human perception for a good quality material. Those physical characteristics are tactility, surface texture, pleasing color, etc., which have some relationship with density and thermal conductivity of materials. Therefore, we chose two fundamental properties of materials, e.g., thermal conductivity and density and those properties were used to rank the physical appeal of the composite materials of this invention. Various colors of the composite materials of this invention also were a factor in the selection process. Materials possessing low thermal conductivity and low density generally were shown to have also poor physical appeal. As a result, those poorly appealing materials were ranked low, L. Most of the commercially available plastics fall in this category. Similarly, materials possessing moderate to high density and low to moderate thermal conductivity or vice versa were ranked medium, M. Some metals and ceramics fall in this category. Furthermore, materials possessing both high density and high thermal conductivity, were ranked high, H. Many precious metals fall in this category.

The two fundamental properties of materials, i.e., density and thermal conductivity, which were used to formulate a "standard" for the composite materials as designated by L, M, or H, were applied to the injection molded composites in this invention. Those composites, which ranked L were not accepted for our application. Conversely, those composites which ranked M and H were accepted for our application. The acceptance criteria for composite materials of this invention were derived from the known value of standard materials, which are perceived to have high tactile properties and high physical appeal. For example, polymeric materials having a thermal conductivity in the range of 0.001 to 0.01 cal/cm-sec-° C., and that are selected from the group consisting of polyethylene, polystyrene, polyester, and polycarbonate or combinations thereof, and one or more materials including, ceramics, ceramic composites, metals and metal alloys in a blended relationship to form a viscous phase mixture, the materials in the viscous phase mixture being selected so that when in a solid phase it has a density greater than 4 grams/cc and a thermal conductivity greater than 0.101 cal/cm-sec-° C. were found acceptable.

The following Table 1 shows the ranking of the materials to low (L), medium (M), and high (H) which is derived from the numerical values of density and thermal conductivity.

The injection molded composites which ranked M and H were acceptable for our application provided they met the criteria of mechanical properties. Therefore, all the injection molded composites, which ranked M and H, were evaluated for their mechanical properties in terms of tensile strength, modulus of rupture and impact resistance. The injection molded article should preferably have a modulus of elasticity greater than 32,000 psi and a fracture stress greater than 3,500 psi.

TABLE 1

| Density, gram/cc | | |
|---|---|---|
| L | M | H |
| 1–3.9 | 4–6.9 | above 7 |

TABLE 2

| Thermal Conductivity, cal/cm-sec-° C. | | |
|---|---|---|
| L | M | H |
| 0.001–0.100 | 0.101–0.150 | above 0.150 |

TABLE 3

Physical Appeal (Arbitrary Unit)

|  | L | M | H |
|---|---|---|---|
| Density | <3.9 | <3.9 | >3.9 |
| Thermal Conductivity | <0.1 | >0.1 | >0.15 |

TABLE 4

Physical Properties of Some Standard Materials

| Material | Class | Density (g/cc) | Rank (L, M, H) | Thermal Conductivity (cal/cm-sec-° C.) | Rank (L, M, H) | Physical Appeal Ranking (L, M, H) |
|---|---|---|---|---|---|---|
| Polystyrene (Zylar ®) | Polymer | 1.05 | L | 0.003 | L | L |
| Gold | Metal | 19.32 | H | 0.746 | H | H |
| Silver | Metal | 10.50 | H | 1.013 | H | H |
| Copper | Metal | 8.96 | H | 0.943 | H | H |
| Aluminum | Metal | 2.90 | L | 0.562 | H | M |
| 316 stainless steel | Alloy | 8.0 | H | 0.039 | L | M |
| Alumina | Ceramic | 3.9 | L | 0.06 | L | L |
| Zirconia | Ceramic | 6.08 | M | 0.009 | L | M |
| SiC | Ceramic | 3.2 | L | 0.15 | M | M |
| TiC | Ceramic | 7.7 | H | 0.03 | L | M |
| Si3N4 | Ceramic | 3.2 | L | 0.05 | L | L |

TABLE 5

Working Examples

| Example # | Composite Composition (% by weight) | Density (g/cc) | Thermal Conductivity (cal/cm-sec-° C.) | Physical Appeal Ranking (L, M, H) |
|---|---|---|---|---|
| Example 1 | *Zylar ® 10% + zirconia 70% + gold 20% | 8.22 | 0.155 | H |
| Example 2 | Zylar ® 10% + TiC 60% + Al 30% | 5.59 | 0.1869 | H |
| Example 3 | Zylar ® 30% + alumina 50% + 316 ss 20% | 3.865 | 0.0387 | L |
| Example 4 | Zylar ® 30% + SiC 60% + Ag 10% | 3.285 | 0.1922 | M |

*Zylar ® is commercially available polystyrene

The working examples given in Table 5 are some typical examples of the compositions we experimented with. Injection molded composites in Example 1 and 2 had a very high physical appeal, which is validated by our arbitrary ranking system, H. These composites did not appear or even felt like any known plastics, but rather were perceived to have added an extra sense of value and durability. Although the physical appeal of the composite in Example 4 was ranked M and acceptable for our application, these do materials have some remote resemblance to plastics. The composite material illustrated in Example 3 was not accepted for our application because the physical appeal of this material was more akin to plastics or commercially available composites.

The aforementioned selection standard was applied to the injection molded composites in this invention. The injection molded composites comprising:

a) 10 to 30% by weight Zylar®,
b) 50 to 70% by weight oxide ceramics, comprising alumina, zirconia, magnesia, silica, and/or mixtures thereof,
c) 50 to 70% by weight oxides of transition elements like V, Cr, Mn, Fe, Co, Ni., and also the oxides of rare earth elements like La, Ce, Pr, Nd and Gd, and/or mixtures thereof,
d) 20 to 70% by weight carbide ceramics, comprising SiC, TiC, $B_4C$, WC, and/or mixtures thereof,
e) 20 to 70% by weight nitride ceramics, comprising TiN, silicon nitride, BN, zirconium nitride, and/or mixtures thereof,
f) 0 to 20% by weight Ti, Al, Mg, and/or mixtures thereof,
g) 0 to 15% by weight Ni, Cr, stainless steel, and/or mixtures thereof,
h) 0 to 15% by weight V, Cr, Mn, Fe, Co, and/or mixtures thereof,
i) 0 to 15% by weight La, Ce, Pr, Nd and Gd, and/or mixtures thereof, have superior physical and mechanical properties compared to plastics.

The shredded feedstock from Examples 1, 2, 3, 4 and 5 were fed in to a BOY Model 22M injection molding machine to form parts having various geometric configurations. The following are some typical injection molding parameters:

| clamp pressure: | 150 bar |
|---|---|
| injection pressure | 40 bar |
| molding temperature | 200 to 230° C. |

Enhancement in mechanical properties due to composite formation with organic (polystyrene) and inorganic (ceramic) materials:

| Sample # | Material | Compound | Percentage | Modulus of Elasticity (PSI) | Fracture Stress (PSI) | Impact Energy (ft. lb.) |
|---|---|---|---|---|---|---|
| A382 | Zylar | none | | 329674 | 3503 | 21.94 |
| A436 | Zylar | Calcined Alumina | 5% | 320769 | 3601 | 22.11 |
| A436 | Zylar | Calcined Alumina | 50% | 644743 | 4965 | 22.055 |
| A436 | Zylar | Calcined Alumina | 75% | 164353 | 6973 | 22.155 |
| A453 | Zylar | Zirconia | 5% | 332887 | 3816 | |
| A435-1 | Zylar | Zirconia | 10% | 335930 | 3835 | 22.00 |
| A435-2 | Zylar | Zirconia | 50% | 459977 | 4010 | |
| A435 | Zylar | Zirconia | 75% | 753365 | 4934 | |

Enhancement Of Liking As Determined By Interviewing People:

| Question | A | B | C | D | E | F | G | H |
|---|---|---|---|---|---|---|---|---|
| Which part looked like the more expensive material? | | 15% | | | | 80% | | 5% |
| Which part feels like the more expensive material? | | 5% | 10% | | | 75% | 10% | |
| Which part considering appearance and weight would make you purchase a camera made from the material used? | 5% | 15% | 5% | 10% | | 50% | | 15% |
| Which part would make you purchase a camera from the appearance only? | 5% | 35% | 10% | 10% | | 25% | 5% | 10% |
| Which part would make you buy a camera buy the way it feels only? | 5% | | 5% | | | 85% | | 5% |

A - Zylar with 10% buy weight Zircona Oxide
B - A mixture of colors that give a marble appearance
C - Zylar coated with Aluminum flakes from spray paint
D - Zylar with Gold Bronze Flakes added
E - Zylar that was laid out in a pan and sprayed with gold spray paint
F - Zylar that was compounded with 65% by weight of calcined alumina
G - Zylar with bumper chrome spray paint
H - no opinion Parts List 105 initial mixing step
110 initial heating step
115 blending of mixture
120 analyze blended mixture
125 adjust mixture
130 secondary heating step
135 extended blending of mixture
140 cooling step
145 pellet forming step
150 injection molding of pellets
155 forming enclosure bodies

What is claimed is:

1. A method of making a feedstock for injection molding composites, comprising the steps of:
   a) mixing at a temperature of 100–150° C. polymeric materials having a thermal conductivity in the range of 0.001 to 0.01 cal/cm-sec-° C. wherein the polymeric materials are selected from the group consisting of polyethylene, polystyrene, polyester, polycarbonate and combinations thereof, and one or more materials are selected from the group consisting of ceramics, ceramic composites, metals and metal alloys in a blended relationship to form a viscous phase mixture, the materials in the viscous phase mixture being selected so that when in a solid phase it has a density greater than 4 grams/cc and a thermal conductivity greater than 0.101 cal/cm-sec-° C. for usage as the feedstock for an injection molded composite, said injection molded composite comprising the polymeric materials and the ceramics, ceramic composites, metals and metal alloys from above, and;
   b) cooling the blended viscous phase mixture to form the feedstock.

2. The method of claim 1 further comprising the step of processing the feedstock by shredding the feedstock and/or forming pellets from the feedstock which are capable of being placed in an injection molding machine and injection molded to form a solid enclosure body.

3. The method of claim 2 wherein the processing of the feedstock includes extruding the feedstock and cutting the extruded feedstock into the pellets.

4. The method of claim 1 wherein the polymeric material is polystyrene and the one or more materials are zirconia and gold.

5. The method of claim 1 wherein the polymeric material is polystyrene and the one or more materials are titanium carbide and aluminum.

6. The method of claim 1 wherein the polymeric material is polystyrene and the one or more materials are silicon carbide and silver.

7. The method of claim 1 wherein the feedstock a modulus of elasticity greater than 32,000 psi and a fracture stress greater than 3,500 psi.

8. The method of claim 1 wherein the one or more materials are Al, Ti, Mg, Al—Ti—V, or alloys or mixtures thereof.

9. The method of claim 1 wherein the one or more materials are Ni, Cr, stainless steel, or mixtures thereof.

10. The method of claim 1 wherein one or more materials are ceramics, thermally and electrically insulating oxides, thermally conductive carbides, or mixtures thereof.

11. The method of claim 1 wherein the ceramic composites are thermally and electrically insulating oxides, including alumina, zirconia, magnesia, silica or mixtures thereof.

12. The method of claim 1 wherein the ceramic composites are thermally conductive carbides, including SiC, TiC, $B_4C$, WC, or mixtures thereof.

13. The method of claim 1 wherein the one or more materials are oxide ceramics which exhibit a wide variety of colors which include oxides of transition elements V, Cr, Mn, Fe, Co, Ni, or mixtures thereof.

14. The method of claim 1 wherein one or more materials are oxide ceramics which exhibit a wide variety of colors which include oxides of rare earth elements La, Ce, Pr, Nd, Gd, or mixtures thereof.

15. The method of claim 1 wherein one or more materials are nitride ceramics which exhibit a wide variety of colors which include TiN, silicon nitride, BN, zirconium nitride, or mixtures thereof.

16. A method of making a feedstock for injection molding composites, comprising the steps of:
   a) mixing at a temperature of 100–150° C. a mixture of a polymeric material having a thermal conductivity in the range of 0.001 to 0.01 cal/cm-sec-° C. and one or more materials including, ceramics, ceramic composites, metals and metal alloys in blended relationship with the polymeric material so that a molded article resulting from the blended mixture has a density greater than 4 grams/cc and a thermal conductivity greater than 0.101 cal/cm-sec-° C. for usage as the feedstock for an injection molded composite, said injection molded composite comprising the polymeric materials and the ceramics, ceramic composites, metals and metal alloys from above; and
   b) cooling the blended mixture to form the feedstock.

17. The method of claim 16 further including the step of processing the feedstock by shredding the feedstock and/or forming pellets from the feedstock which are capable of being placed in an injection molding machine and injection molded to form a solid enclosure body.

18. The method of claim 17 wherein the processing of the feedstock includes extruding the feedstock and cutting the extruded feedstock into the pellets.

19. The method of claim 16 wherein the polymeric material is polystyrene and the one or more materials are zirconia and gold.

20. The method of claim 16 wherein the polymeric material is polystyrene and the one or more materials are titanium carbide and aluminum.

21. The method of claim 16 wherein the polymeric material is polystyrene and the one or more materials are silicon carbide and silver.

* * * * *